United States Patent [19]

Vaughn, Jr.

[11] 4,189,727
[45] Feb. 19, 1980

[54] DISPLAY ADVANCE SYSTEM FOR A WORD PROCESSOR

[75] Inventor: Louis E. Vaughn, Jr., Chatsworth, Calif.

[73] Assignee: Lexitron Corporation, Chatsworth, Calif.

[21] Appl. No.: 868,885

[22] Filed: Jan. 12, 1978

[51] Int. Cl.² ........................................... G06K 15/20
[52] U.S. Cl. .................................. 340/711; 340/799; 340/750; 364/900
[58] Field of Search ................ 340/324 AD, 798, 799, 340/711

[56] References Cited

U.S. PATENT DOCUMENTS

| | | | |
|---|---|---|---|
| 3,593,310 | 7/1971 | Kievit | 340/799 X |
| 3,610,902 | 10/1971 | Rahenkamp et al. | 340/799 X |
| 3,618,032 | 11/1971 | Goldsberry et al. | 340/324 AD |
| 3,699,531 | 10/1972 | Heimann | 340/324 AD |
| 3,757,037 | 9/1973 | Bialex | 340/711 X |
| 3,786,429 | 1/1974 | Goldman et al. | 340/711 X |
| 3,895,374 | 7/1975 | Williams | 340/798 X |
| 3,909,818 | 9/1975 | Dalke et al. | 340/324 AD |
| 3,939,458 | 2/1976 | Kuntze | 340/798 X |

*Primary Examiner*—David L. Trafton
*Attorney, Agent, or Firm*—Martin R. Horn

[57] ABSTRACT

In a word processor having a video screen capable of displaying only a portion, typically one-third, of a full page of text stored in a memory, a display advance system causes the screen to display the next one-third text section upon actuation of a control key. This is accomplished by (a) ascertaining from the location of a displayed cursor the identity of the next sequential text section and the initial address of the memory area storing that next section, and (b) generating the video display using text from that memory area, beginning at the next video frame.

12 Claims, 8 Drawing Figures

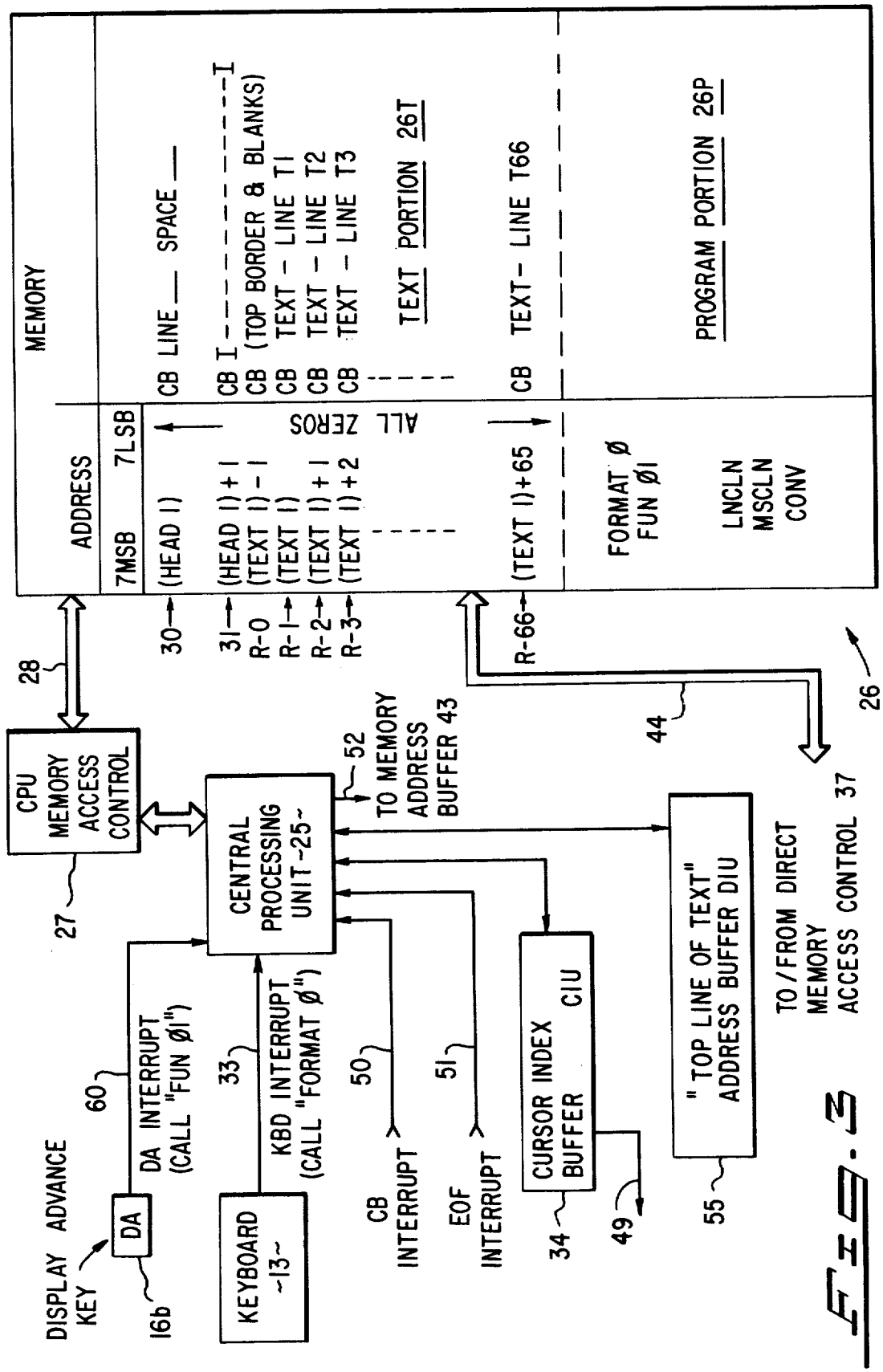

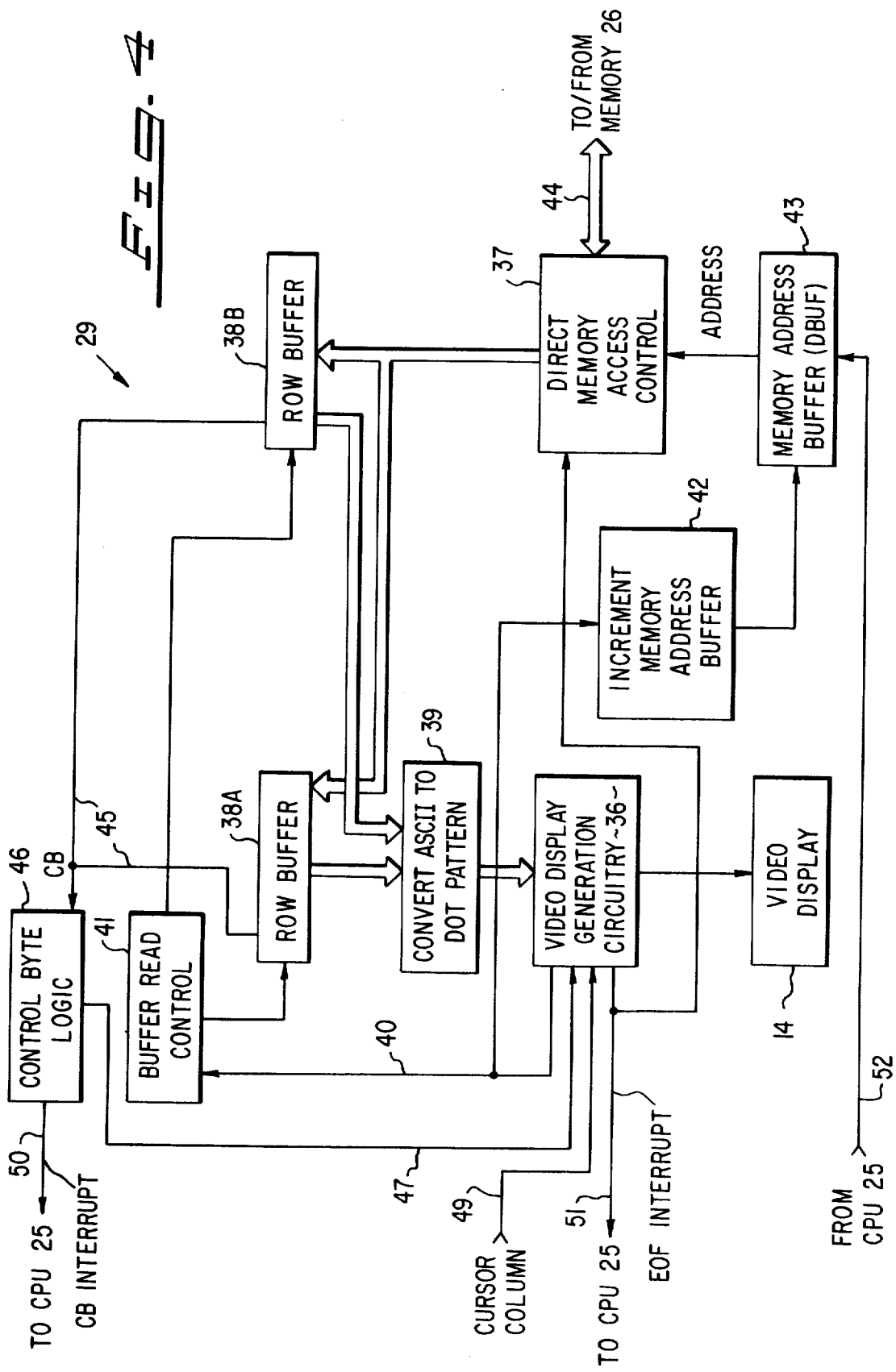

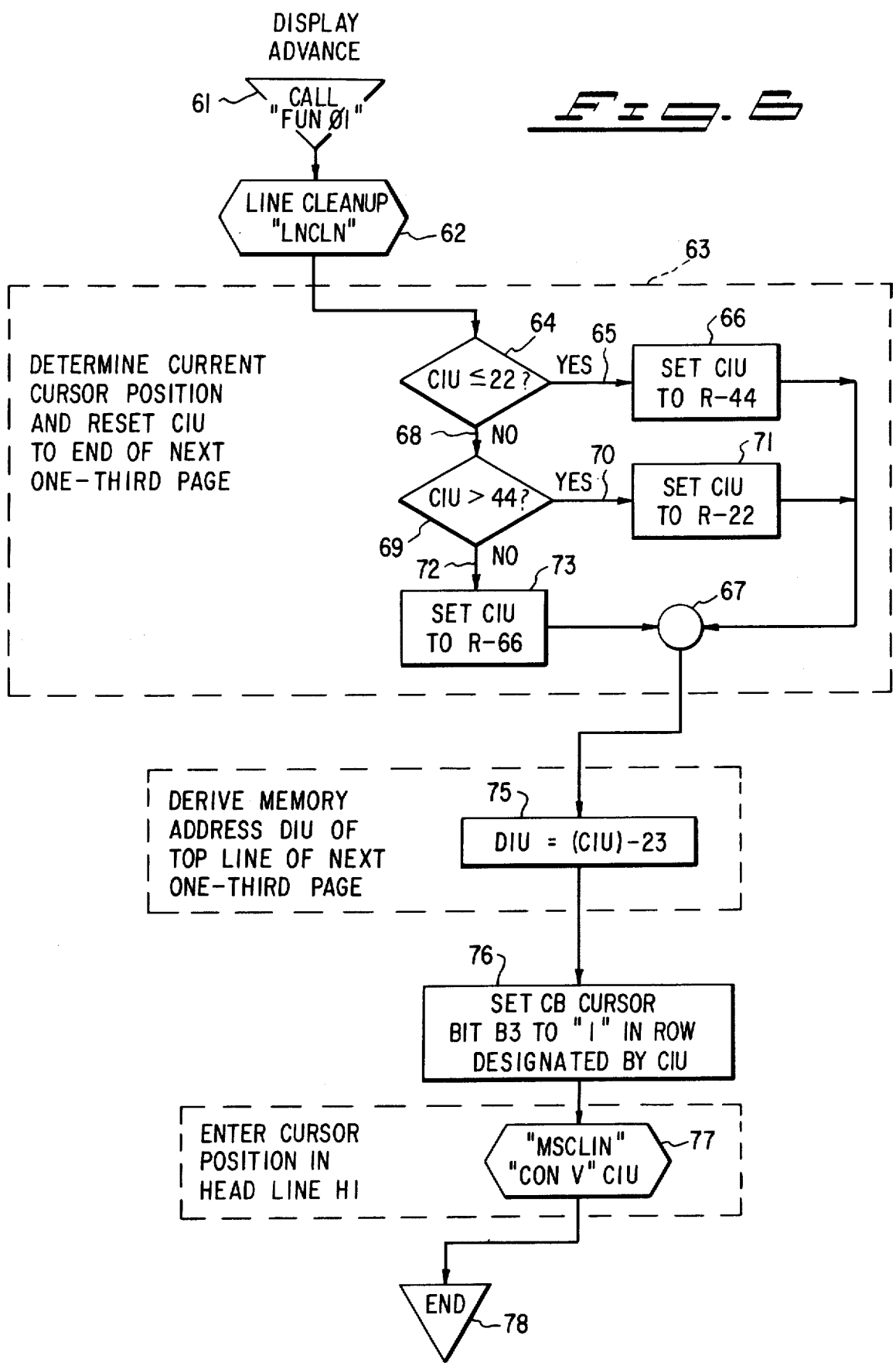

DISPLAY ADVANCE SYSTEM FOR A WORD PROCESSOR

BACKGROUND OF THE INVENTION

1. Field of the Invention

The present invention relates to a display advance system for a word processor having a video screen, and particularly to such a system wherein actuation of a DISPLAY ADVANCE control key causes the next consecutive section of a stored page of text to be displayed on the screen.

2. Description of the Prior Art

Use of a word processing system offers considerable benefits over conventional typing of correspondence or text material. Errors readily can be corrected, and all forms of text editing can be accomplished, including the insertion, deletion and rearrangement of words, lines or paragraphs of text. Rapid letter-perfect printout is achieved.

Word processors having video screen displays are particularly useful. As the operator keys in new material, the text immediately is displayed on the screen. Errors can be spotted and corrected prior to printout. Words can be moved automatically to compensate for insertion or deletion of material. Rearranged text can be viewed in its new position, and the entire page can be verified visually prior to printout. Thus such a videoscreen-based text-processing system offers significant advantages over "blind" automated word-processing systems wherein the corrections, insertions or deletions are made in memory, but can not be seen by the operator until a hard copy printout is produced.

In the past, the widespread acceptance of video display word processors has been impeded by the high cost of such systems. Part of this high cost was attributed to the speed requirements of the electronic circuitry required to generate a video display of a full page of text. For example, a video screen capable of displaying 68 lines of text, each 102 characters long, has available an average of 2.4 microseconds to generate each character on the screen, at a frame rate of 60 frames per second. The high speed electronic circuitry required to facilitate such a display significantly increases the equipment cost.

A substantial decrease in system cost is achieved by providing a word processor with a video screen which displays only a portion, typically one-third, of a full page of text. Such an arrangement gives the operator all of the benefits of video display text processing, but reduces the electronics speed requirements by a factor of almost three. Thus for a 25 line display having a frame rate of 60 frames per second, with 102 characters per line, and average time of 6.5 microseconds is available for generating each character.

An apparent problem associated with a word processor in which only one-third of a page is displayed relates to proofreading. As the operator reads down toward the bottom of the displayed text section, it becomes necessary to advance the display to show the following sections of text. In the past, this has required the tedious scrolling or "rolling up" of the display one line at a time. Such scrolling is distracting to the proofreading operation.

A principle object of the present invention is to provide a display advance system for a videoscreen word processor in which, when a DISPLAY ADVANCE control key is depressed, the display automatically advances to the next section of text. Thus if the video screen normally displays one-third of a full page of text, depression of the DISPLAY ADVANCE control key will cause the next one-third section immediately to appear. In a preferred embodiment, if the bottom one-third section of the text currently is being displayed, the display advance operation next will cause the top one-third of the same page to appear. Advantageously, each section of display begins with a repeat of the bottom line of the previous section, thereby aiding smooth comprehension of the text being proofread.

Certain display advance techniques have been disclosed in the past. For example, the U.S. Pat. No. 3,706,075 to Fredrickson et al describes the proofreading problem in conjunction with a text editing system for newspaper copy. The Fredrickson system employs a cathode ray screen which may be "rolled up" or "rolled down" one line at a line as the editing proceeds. This is facilitated by using a recirculating shift register-type memory having a character position capacity substantially greater than can be displayed at one time on the screen. Operation of a "roll-up" or "roll-down" key toggles by one count the contents of a register which controls line accessing of the data in the recirculating memory.

Another one-line-at-a-time scrolling system is disclosed in the U.S. Pat. No. 3,956,739 to Ophir et al. In that system, which is not specifically intended for word processing, the frame address memory is incremented by a value corresponding the number of characters in each displayed row. This incrementing typically occurs once each second, so that the display appears to roll upward continuously.

Another system for enabling data to appear to be travelling up or down across the face of the display tube is disclosed in the U.S. Pat. No. 3,593,310 to Kievit. Here, the scrolling is accomplished by altering the memory storage position of the data to be displayed. For a one line shift, the entire set of data to be displayed is read out of the memory from one location and reentered into the memory at a shifted location from which the new display is generated.

A different implementation of "roll-up" is disclosed in the U.S. Pat. No. 4,020,483 to Baumgartner. Here, the CRT deflection signals are modified to cause row-by-row displacement of the characters in the upward direction. The U.S. Pat. No. 3,540,012 to Ehrman shows a system for line insertion or deletion in a CRT display.

The U.S. Pat. No. 3,618,032 to Goldsberry et al discloses another method by which circuit speed can be reduced in a videoscreen word processor. In this system, only a few lines, typically five, of information are displayed in a portion of a relatively large CRT screen. Deflection control circuitry is used to locate the lines on the CRT in a position corresponding to the location of those lines in the stored page of text. For example, if the five lines are in the middle of the text, they will be displayed at the center of the CRT tube.

SUMMARY OF THE INVENTION

The present invention provides a display advance system for a word processor having a video screen that displays only a section, typically one-third, of a full page of text stored in a memory. When a DISPLAY ADVANCE control key is depressed, a determination is made as to which section of the page follows that which is currently displayed. The initial address of the memory area storing that next text section is derived, and is used to generate a video display of the new section beginning at the next video frame.

Advantageously, the next section of text is determined by reference to the current position of a sursor that is displayed on the screen. A program, under microprocessor control, examines the current cursor row position and determines whether this position lies in the top, middle or bottom one-third text section. The same program then relocates the cursor to the bottom row of the next text section, and enters into a buffer the memory address in which the top line of the new text section is stored.

Beginning with the next video frame, this "top line of text" address is used to direct readout from the memory of the new section of text for utilization by the video generation circuitry. As a result, the new one-third text section appears on the screen.

BRIEF DESCRIPTION OF THE DRAWINGS

A detailed description of the invention will be made with reference to the accompanying drawings wherein like numerals designate corresponding parts in the several FIGURES.

FIG. 3 is a block diagram of the central processing and memory portions of the electronics used by the word processor of FIG. 1.

FIG. 4 is an electrical block diagram of the video display components of the word processor of FIG. 1.

FIG. 6 is a flow chart of a central processor program for obtaining the address of the memory location storing the top line of the next one-third section of text to be displayed, upon actuation of the DISPLAY ADVANCE control key.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

Figure 1:
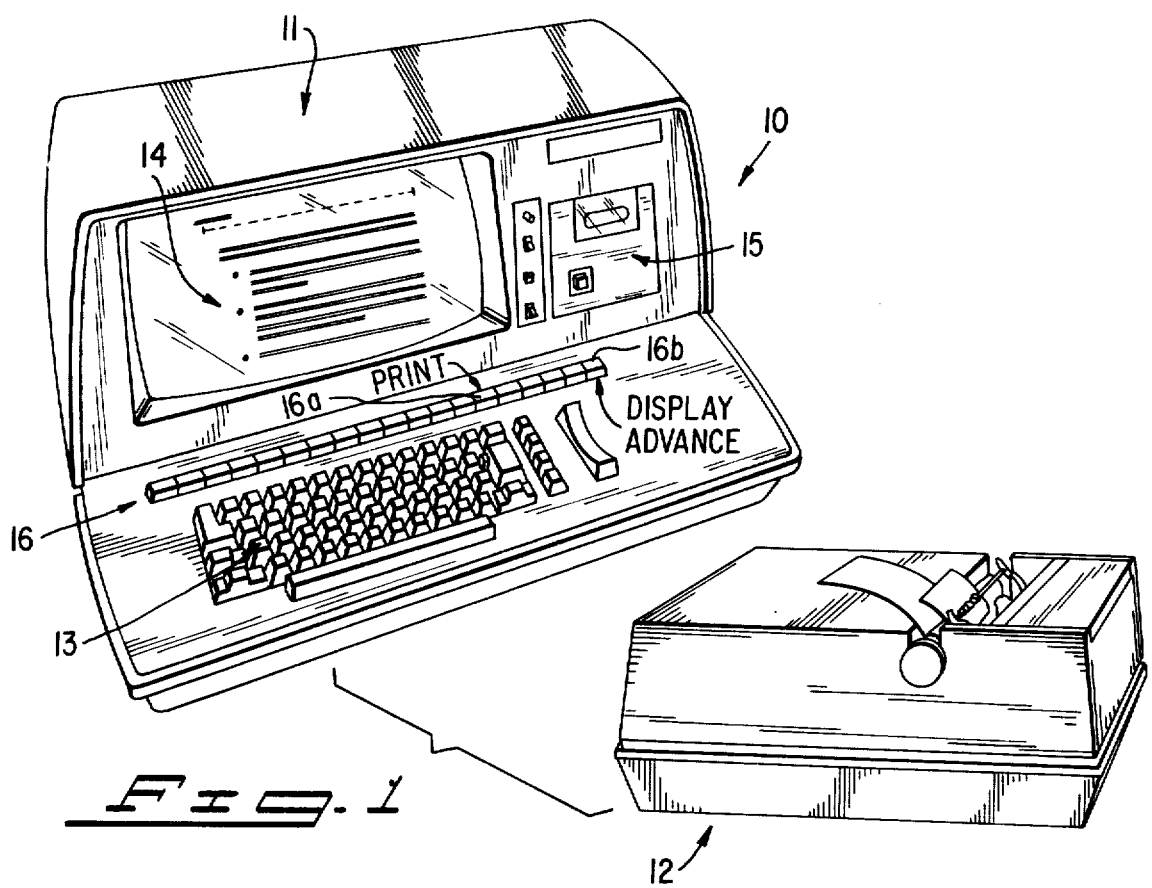
FIG. 1 is a pictorial view of a word processor employing the inventive display advance system.

The inventive display advance system advantageously is employed in a word processor 10 of the type shown in FIG. 1. Such a system includes a keyboard and display unit 11 and an associated printer 12. As an operator types information on a keyboard 13, the text appears on a video display screen 14. Simultaneously, the text is stored in a memory (not shown) and/or recorded on a magnetic tape cassette 15. Text editing readily is accomplished by actuating certain function control keys 16 such as "DELETE", "INSERT", "ERASE" and "MERGE". When the text is letter-perfect on the screen 14, the operator places a sheet of paper into the printer 12 and presses the "PRINT" control key 16a. The complete text is then printed out at high speed by the printer 12.

In accordance with the present invention, the display unit 11 normally does not display a full page of text. Rather, it displays approximately one-third of a page. By pressing a "DISPLAY ADVANCE" control key 16b, the display immediately will advance to the next one-third section. Thus when proof reading, the operator need not tediously scroll through the display line by line, but can merely depress the DISPLAY ADVANCE key to obtain a display of the next one-third section.

Figure 2A:
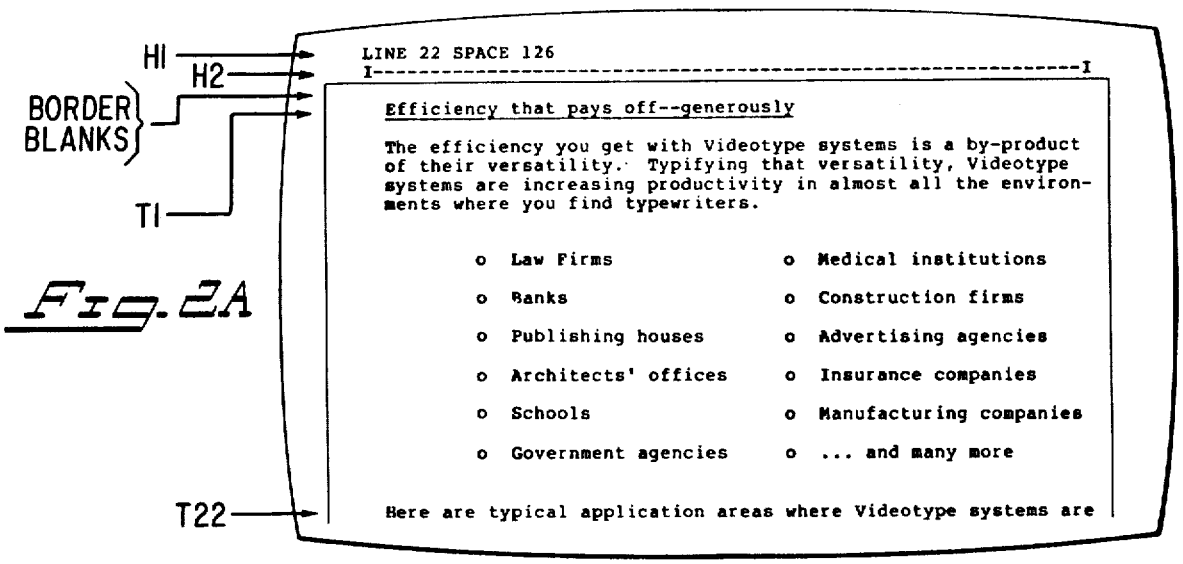
FIGS. 2A, 2B and 2C respectively show typical displays of the top, middle and bottom one-third sections of a page of stored text, as would appear successively on the video screen of the word processor of FIG. 1 each time that a DISPLAY ADVANCE control key was depressed. Although shown in the drawings as a black-on-white display, on an actual video screen the characters may be green on a black background.
Figure 2B:
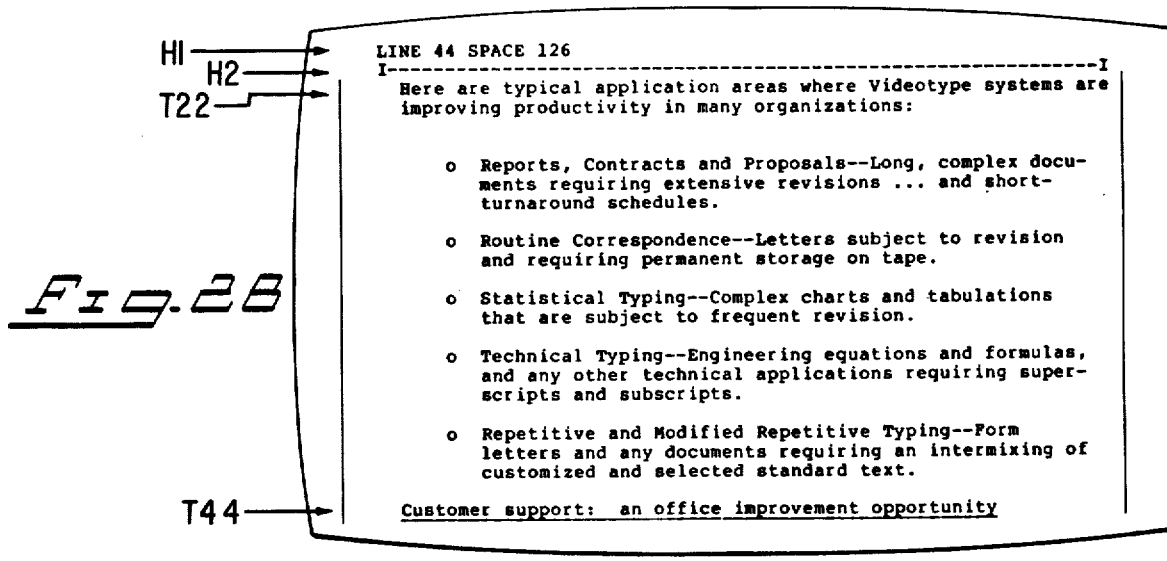
Figure 2C:
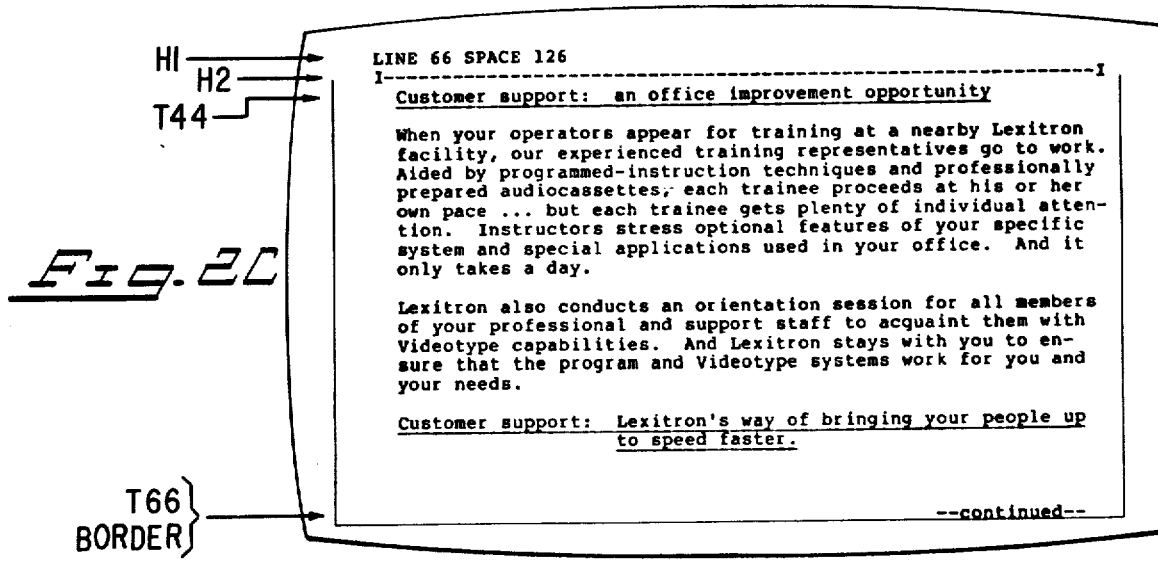

This display advance feature is illustrated in FIG. 2A, 2B and 2C. In FIG. 2A, the top one-third section of an in-process full page of text is displayed on the screen 14. In the embodiment illustrated, the system 10 has a capability of displaying sixty-six lines of text per page, plus an additional pair of head lines H1, H2 which respectively display the cursor position and the left and right margin markers. In the top one-third section display (FIG. 2A), the top line is blank, and the lines T1 through T22 of the text are shown. The display of the middle one-third section (FIG. 2B) includes the head lines H1, H2 and lines T22 through T44 of the text. The bottom one-third display (FIG. 2C) again has the head lines H1, H2 followed by lines T44 through T66 of the text. With this arrangement, each display has a total of twenty-five lines, including the head lines H1, H2. The first row of text in the middle one-third display (FIG. 2B) duplicates the last line T22 of text in the top section (FIG. 2A). In the bottom section (FIG. 2C), the first line of text T44 is a duplication of the last line of text from the middle one-third section.

As the operator types new text into the system 10, using the keyboard 13, a cursor (not shown) is displayed on the screen 14 at the line and space position of the character next to be entered. Typically, the cursor appears as a blinking underline at this location. The line and space positions of the cursor are displayed numerically in the head line H1. Thus, if a text character is being entered in the twelfth line of text, at the third space from the left margin, a blinking underline cursor will appear at that location on the display, and the head line H1 will state "LINE 12 SPACE 3".

When the DISPLAY ADVANCE key 16b is depressed, circuitry described below in conjunction with FIGS. 3 and 4 determines from the current cursor location which portion of the text currently is being displayed. The same circuitry then determines the first line of the next one-third section of text, and changes the display to show that next section on the screen 14. When the DISPLAY ADVANCE key 16b is again depressed, the following one-third section is displayed. If the bottom one-third section of text is currently displayed (FIG. 2C), depression of the DISPLAY ADVANCE key 16b will cause the top one-third section (FIG. 2A) to come into view again.

Circuitry for carrying out the display advance function is illustrated in FIGS. 3 and 4. Overall control of the word processing system 10 is established by a microprocessor central processing unit (CPU) 25 which executes programs stored in a program portion 26P of a memory 26. The memory 26 also includes a text portion 26T which stores the characters of text that are to be displayed on the screen 14 and printed by the printer 12. The CPU 25 accesses both the program and text sections of the memory 26 via a control unit 27 and a buss 28. The CPU 25 may comprise a type 8080 integrated circuit microprocessor available commercially from Intel, Inc.

The text portion 26T of the memory 26 is organized in a manner which simplifies access and video display generation by the display circuitry 29 of FIG. 4. To this end, the memory portion 26T is organized in rows of storage positions that correspond to lines of the display. Each such row advantageously consists of 128 contiguous storage locations each capable of storing one type of information, typically a single 8-bit control byte (CB) or an ASCII character. Each memory row may begin on an even modulo 128 boundary so that the low order seven bits of the row address code all will be zeros.

This memory arrangement is illustrated in FIG. 3. There, the information to be displayed in the head line H1 occupies a row 30 of 128 memory locations beginning at an address in which the seven least significant bits (7LSB) all are zeros. The next seven more significant (7MSB) have an arbitrary binary value, referred to herein as "(HEAD 1)" which together with the 7LSB-bits identify the specific memory location. Data to be displayed as head line H2 is stored in the next contiguous row 31 of 128 storage positions beginning at a modulo 128 boundary. In this instance, the binary value of the 7MSB-bits of the address will be one greater than the 7MSB valve for the row 30, that is, [(HEAD 1)+1], and the 7LSB-bits all will be zeros.

Each line of text likewise may be stored in a row of memory consisting of 128 contiguous positions beginning at a modulo 128 boundary. In the example illustrated in FIG. 3, the first line of text T1 is stored in a memory row R-1 beginning at an address which has all zeros as the seven least significant bits and an arbitrary value, herein designated "(TEXT 1)" for the seven next more significant bits.

Each successive line of text begins at the next successive modulo 128 boundary. Thus the second line of text T2 will be stored in the memory row R-2 beginning at an address in which the 7MSB-bits have the value [(TEXT 1)+1] and the 7LSB-bits are all zeros. The remaining sixty-four lines of text T3 through T66 are stored in the next consecutive memory rows R-3 through R-66 in which the 7MSB-bits have the corresponding values [(TEXT 1)+2] through [(TEXT 1)+65] and the 7LSB-bits all are zeros.

Each row of stored text begins with a control byte CB which provides certain information about the row. For example, one bit (the "cursor bit B3") in the control byte is set to "1" if the cursor currently is situated in the corresponding line of text. If not, the cursor bit B3 is set to "0". Another pair of bits (the "interrupt bits B6,B7") are set to "01" if a control byte interrupt, described below, is to be called. Other CB control functions may include top or bottom border generation, line blinking or generation of a line of blanks.

Following the control byte in each memory row R-1 through R-66 are up to 127 text characters. The column position of each such character is designated by the 7LSB-bits of the memory address, which range from (0000001) through (1111111) for the corresponding columns 1 through 128. The CB is in the address position 7LSB=(0000000).

When the operator types in a new character on the keyboard 13, the CPU 25 enters this character into the memory text section 26T at the position designated by the cursor. For example, if the cursor is situated at line 12, space 3, the new character will be entered into text line T12, in the third column. The actual memory entry will be made in row R-12 at the column address 7LSB=(0000110). A program (herein called "FORMAT φ") for carrying out this text entry operation is stored in the program section 26P. That program, which forms no part of the present invention, is actuated in response to a keyboard interrupt signal supplied to the CPU 25 from the keyboard 13 via a line 33.

The current cursor row and column location is stored in a cursor index buffer 34 (FIG. 3). As each new text character is entered from the keyboard 13 into the memory 26, the cursor location is incremented accordingly. As consecutive characters are entered in the same line of text, the cursor column value is incremented by "1". As each new line is reached, or each time a carriage return is entered via the keyboard 13, the cursor row value is incremented. For each such change in cursor location, the CPU 25 executes another program, herein designated "CONV" which converts the cursor row and column values to ASCII characters, and enters these values into the appropriate "LINE" and "SPACE" positions in row 30 of the memory 26. As mentioned above, this will result in the cursor location being shown in the head line H1 of the display. Further, each time the cursor row location changes, the cursor bit B3 of the control byte in the corresponding row is set to "1" and the cursor bit in the row where the cursor was previously situated is set to "0".

Generation of the video display is accomplished by the circuitry 29 of FIG. 4. There, the video display screen or cathode ray tube (CRT) 14 is driven by appropriate video display generation circuitry 36 which is known per se. To display a line of text, the contents of the corresponding row of the memory text section 26T is transferred via a direct memory access control 37 to one of a pair of row buffers 38A, 38B. A conversion circuit 39 converts each ASCII character in the row of text stored in the buffer 38A or 38B to a dot pattern which is supplied to the video display generation circuitry 36. This circuitry 36 then produces the necessary horizontal, vertical and intensity modulation control signals to cause the corresponding line of text to appear on the video display screen 14.

Lines of displayed text are obtained alternately from the two row buffers 38A, 38B. While the line of text stored in the row buffer 38A is being converted to a video display, the next line of text will be transferred from the memory 26 to the other row buffer 38B. When display generation of each line has been completed, a signal associated with the horizontal position of the display will be provided by the circuitry 36 on a line 40. This signal will cause a buffer read control circuit 41 to direct the alternate row buffer (e.g., the buffer 38B) to supply the next line of text to the video display generation circuitry 36. The following line of text from the memory 26 then will be loaded into the other row buffer (e.g., the buffer 38A) for use in generating the following line in the video display.

To accomplish accessing of consecutive lines of text from the memory 26, the signal on the line 40 also causes a circuit 42 to increment by "1" the 7MSB portion of a memory address stored in a buffer 43. The circuit 42 also may reset the 7LSB-bits of the address all to zeros. As a result, the buffer 43 will supply to the direct memory access control 37 the initial address of the next consecutive row of text in the memory 26. The control circuit 37 obtains priority access to the memory 26 via a buss 44 and transfers the lines of text beginning at the address designated by the contents of the buffer 43 to the appropriate one of the row buffers 38A, 38B. This transfer may be accomplished one byte at a time, with the 7LSB-bits of the memory address being incremented "1" as each byte is transferred. The time taken to transfer an entire row of text from the memory 26 to one of the row buffers 38A, 38B is less than the time required to generate the portion of the video raster display corresponding to the line of text contained in the other row buffer.

The control byte (CB) for each accessed line of text is supplied via a line 45 to appropriate logic circuitry 46. This circuitry 46 analyzes the control byte to determine what special functions are required. If the CB indicates that the line currently being generated should be blinked on and off, or that a top or bottom border should be generated in this line, appropriate control signals are supplied via line 47 to the video display generation circuitry 36. Alternatively, the control byte may indicate that the entire line is to be blank, or that the cursor is contained in the present line. In these instances also, appropriate control signs are supplied via the line 47 to the circuitry 36. If cursor generation is required in the row of text being generated, the cursor column location may be supplied to the display generation circuitry 36 from the cursor index buffer 34 (FIG. 3) via a line 49.

Another function which may be specified by a control byte (CB) is an interrupt. Thus if the interrupt bits B6, B7 are set to "01", the logic 46 will supply a CB interrupt signal to the central processing unit 25 via a line 50. As described below, this CB interrupt is used to control updating of the memory address buffer 43 so as to designate which line of text will appear at the top of the display 14.

When the circuitry 36 completes generation of a full video scan or frame, which typically takes 1/60th of a second, an end of frame (EOF) interrupt signal is supplied to the CPU 25 from the circuitry 36 via line 51. This EOF interrupt causes the CPU 25 to supply to the memory address buffer 43, via a line 52, the address (Head 1) of the row 30 in the memory 26 which stores the contents of the head line H1. The EOF interrupt signal then causes the direct memory access control to transfer from the memory 26 into the row buffer 38A the line H1 of information stored in the memory row 30, the corresponding address (HEAD 1) of which now is stored in the address buffer 43.

As the new video scan begins, the display generation circuitry 36 will translate the head line H1 information from row buffer 38A into the top line of the video display. As this top line is being generated, the memory access control 37 will transfer the second head line H2 information from the memory row 31 to the row buffer 38B. To implement this transfer, the memory address buffer 43 is incremented by "1" by the circuitry 36 and 42 when the new scan starts. Thus as the head line H1 video display begins, the buffer 43 will contain the address [(HEAD 1)+1] of the memory row 31 from which the second head line H2 information is to be transferred to the row buffer 38B.

Advantageously, the control byte CB of the second head line H2 contains an interrupt bit B3 which is "1". Thus as the circuitry 36 begins display generation of the head line H2, a CB interrupt signal is supplied by the logic 46 to CPU 25 via the line 50.

In response to receipt of the CB interrupt signal, the CPU 25 supplies to the memory address buffer 43, via the line 52, the address of the top line of text that is to be displayed on the screen 14. This "top line of text" address is stored in a buffer 55 (FIG. 3) that is updated as described below, during certin system operations which include keyboard entry of new text and display advance.

When the "top line of text" address has been received by the memory address buffer 43, the control dircuit 37 causes the corresponding row of text to be transferred from the memory 26 to the row buffer 38A. Thus as soon as video display of the second head line H2 is completed, the circuitry 36 will begin video display generation of the designated top line of text, which is now stored in the row buffer 38A. For example, if the "top line of text" address supplied to the buffer 43 was [(TEXT 1)+2], corresponding to memory row R-3, the text line T3 will have been stored in the row buffer 38A and this line T3 will appear as the top line of text in the generated video display.

As the display of that top line of text begins, the next line of text will be accessed by the control 37 and supplied to the row buffer 38B. The address of this row of text will be present in the buffer 43 as a result of the incrementing that occurred at the completion of video display of the head line H2. Thereafter, consecutive rows of text will be displayed until occurrence of the next end of frame EOF interrupt. As each line is displayed, the memory address buffer 43 will be incremented and the following row of text will be transferred to the next available row buffer 38A or 38B.

Figure 5:
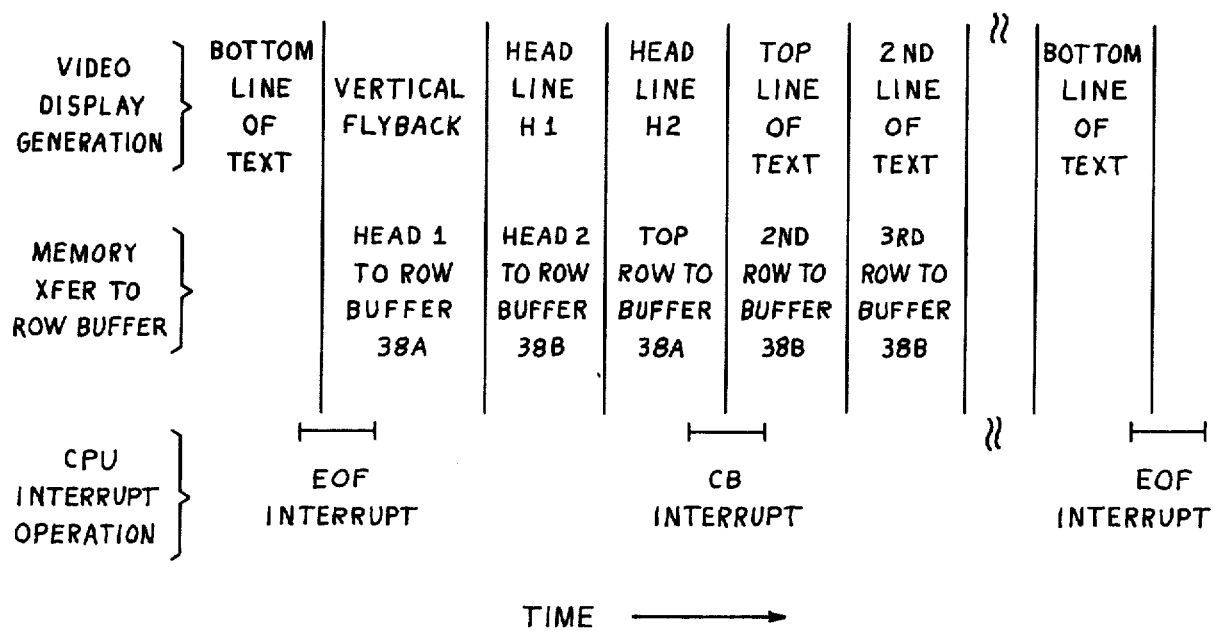
FIG. 5 is a timing diagram showing the order of memory access and central processor interrupts during generation of each frame of the video display.

A timing diagram illustrating this display generation routine is shown in FIG. 5. The occurrence time of the EOF AND CB interrupts are shown, as is the order of data transfer between the memory 26 and the row buffers 38A, 38B. The loading of one row buffer, or 38B while the other is used for display generation also is illustrated.

During normal text display, the "top line of text" address (herein designated "DIU") stored in the buffer 55 (FIG. 3) is updated as additional text is entered into the memory 26 from the keyboard 13. When typing of a new page begins, the DIU address is set to (TEXT 1), which is the address of the first line of text in the memory 26. The buffer 55 remains set at this value as typing continues, until text entry on the bottom line of the display is completed. The next carriage return will initiate typing on the following line of text. To ensure that this line is displayed, the contents of the "top line of text" address buffer 55 will be incremented by "1". As a result, one line of text will be deleted from the top of the display, and the new line of text currently being typed will be shown at the bottom of the display. Since the cursor row indicates which line currently is being typed, the cursor row value (herein "CIU") stored in the buffer 34 may be used by the CPU 25 to ascertain when typing in the bottom line of the display has been completed, and thereafter to increment the DIU address in the buffer 55.

Rather than displaying the first line of text immediately below the margin markers in the second head line H2, it may be desirable to insert a top border and a row of blanks. This can be done with a single control byte CB encoded to direct generation of the border and blanks. This control bit advantageously is stored in the memory 26 at an address having its 7MSB-portion of the address equal to one less than the same portion of the row R-1 address associated with the first line of text. Thus the control byte advantageously is situated at row R-0 with an address (TEXT 1)−1, as shown in FIG. 3. If this address of the row R-0 is supplied to the memory address buffer 43 after occurrence of the CB interrupt, the control byte logic 46 will cause the video display generation circuitry 36 to produce a top border and a row of blanks on the display 14 immediately below the margin markers. This is illustrated in FIG. 2A. Thereafter, incrementing of the memory address buffer 43 by "1" will produce the address (TEXT 1) of the memory row R-1 containing the first line of text. As a result, line T1 of the text will appear on the display immediately below the row of blanks followed by additional lines of text in consecutive order. For displays which include the last line T66 of text, a bottom border may be produced by appropriately setting the bottom border bit in the control byte CB stored in row R-66 of the memory 26 and associated with this last line of text.

In accordance with the present invention, the display advance function is implemented by modifying the "top line of text" address DIU each time the display advance key 16b is depressed. For the embodiment illustrated in FIGS. 2A, 2B and 2C, the "top line of text" respectively is set to correspond to the row R-0, the row R-22 or the row-44, depending on which portion of the page was being displayed when the DISPLAY ADVANCE key 16b was depressed.

Determination of the current cursor position and resetting of the "top line of text" address DIU is carried out by a program, herein called "FUN $\phi$1", which is executed by the CPU 25. This program, which is illustrated by the flow chart of FIG. 6, is initiated by a DA interrupt signal that is supplied to the CPU 25 via a line 60 (FIG. 3) from the DISPLAY ADVANCE key 16b. When this signal is received, the CPU 25 begins to access the "FUN $\phi$1" instructions from the memory program section 26P, as designated by the block 61 in FIG. 6. This program in turn directs the CPU 25 to execute a line cleanup subroutine (block 62) called "LNCLN". This subroutine completes the formating of the line of text currently being typed. For example, it may ensure that the current line is in standard format, including a control byte, text characters, carriage return if required, and blanks in the remaining memory row locations.

Next a subroutine (block 63) is executed to determine the current cursor position and to reset the cursor index buffer 34 to designate the last row and last column of the next one-third page of text.

This is accomplished by first examining the current cursor row index CIU to see if it is less than or equal to 22 (block 64). If so, this means that the last line of text currently being displayed is within the top one-third of the page. Accordingly, the program block 64 is exited via a path 65 and an operation is carried out (block 66) by the CPU 25 which sets the cursor row index CIU in the buffer 34 to contain the memory address for the last line of text in the middle one-third page. In the example described herein (FIG. 2B), this text line T44, so that CIU is set to the address of memory row R-44. The block 66 is exited via a common path 67.

If the current cursor is not in the first 22 lines of text, the block 64 is exited via a path 68. A determination (block 69) then is made as to whether to the current cursor position is in the bottom one-third page. If so, the cursor row index "CIU" will be greater than 44, and the block 69 will be exited via a path 70. The cursor row index CIU then will be set to the memory row R-22 which contains the bottom line T22 of text in the top one-third display (FIG. 2A). The block 71 also is exited via the path 67.

If the current cursor position is in the middle one-third page, between the text lines T23 and T44, the block 69 will be exited via a path 72. The cursor row index CIU will be set (block 73) to the memory row R-66 which contains the last row of text T66 of the bottom one-third page. The block 73 also is exited via the path 67.

At this point, the cursor index buffer 34 contains the row address of the last line of text of the one-third page display that follows the current cursor position. Advantageously, the cursor column index in the buffer 34 may be set to the last character position in the corresponding line of text. That may be accomplished by the program blocks 66, 71 and 73 setting the seven least significant bits of the cursor address in the buffer 34 to all ones. Alternatively, if the memory row format includes a carriage return as the obligatory last character after the text characters, the cursor column index may be set to the column address of the last character preceding the carriage return.

The display advance program (FIG. 6) next causes the CPU 25 to derive the "top line of text" address DIU for the one-third page section next following the previous cursor position. This is readily accomplished (block 75) by subtracting from the cursor row index CIU now in the buffer 34 the number (herein "23") of lines in the video display, excluding head lines H1, H2. The resultant "top line of text" address DIU then is entered into the buffer 55.

By way of example, if the cursor had been situated in text line T50 prior to depression of the DISPLAY ADVANCE key 16b, the subroutine 63 would have determined that this was within the bottom one-third page, and would have set the cursor row index CIU to the memory row R-22 corresponding to the last line of text in the following (i.e. top) one-third page display. At the program block 75, the address R-0, corresponding to the top line of the first one-third display (FIG. 2A) would have been entered into the "top line of text" address buffer 55.

Next, the cursor bit B3 in the row designated by the CIU index in the buffer 34 is set to "1"(block 76). The subroutines "CONV" and "MSCLIN" are used (block 77) to convert the cursor row and column values stored in the buffer 34 to ASCII characters, and to insert these characters into the appropriate places in the memory row 30 which stores the head line H1. This terminates the display advance program (block 78).

Now, when the display circuitry 29 begins generation of the next video frame, the CB interrupt will cause the CPU 25 to provide the new "top line of text" address DIU from the buffer 55 to the memory address buffer 43. Since the address DIU has been set by the display advance program (FIG. 6) to designate the top line of the following one-third page, this new section of text now will be displayed on the screen 14. If the DISPLAY ADVANCE key 16b again is depressed, the CPU 25 again will execute the "FUN $\phi$1" program of FIG. 6, which will result in the "top line of text" address DIU being changed to the address of the top line of the next succeeding one-third page. The new display will appear upon occurrence of the next video frame following modification of the DIU address in the buffer 55. In this manner successive actuation of the DIS- PLAY ADVANCE key 16b will cause consecutive display of the top, middle and bottom sections of the stored text.

The division of the stored text into three sections is a design choice and the invention is not so limited. The stored text could be divided into two sections, or into four or more sections that are consecutively displayed. Further, it is not necessary to have the display advance from the bottom section of the page to the top of the same page. Alternatively, the display could advance from the bottom of one page to the top of a different, successive page stored elsewhere in the memory 26, for example, at consecutive row locations following the row R-66. Furthermore, the arrangement of head line, borders and rows of blanks is completely arbitrary. Arrangements other than those shown can be used. Further, the addresses for the memory 26 need not end in all zeros. That is, each stored text row need not end on a modulo 128 boundary, but may be otherwise arranged.

What is claimed is:

1. In a word processing system having a video screen capable of displaying only a portion of a full page of text, the improvement for advancing the display directly to the next one of a sequence of primarily different text sections into which said full page is fixedly divided, each of said sections being individually, completely displayable on said screen, comprising:
    display advance control means, actuated by a "DISPLAY ADVANCE" control, for ascertaining from the currently displayed portion of said text the identity of the next sequential section, and
    display circuitry for utilizing said ascertained identity to directly cause said next sequential section of text to be displayed on said screen.

2. A word processing system according to claim 1 further comprising:
    a memory for storing said full page of text, said text sections occupying designated areas of said memory, said control means ascertaining said identity by determining which of said designated areas contains a specified element in said currently displayed portion of text.

3. A word processing system according to claim 2 wherein said specified element comprises a cursor displayable on said screen at a location corresponding to a selected text character, said system further comprising:
    a cursor index buffer for storing the memory address at which said selected text character is stored in said memory, said control means including:
    comparator means for comparing the memory address in said cursor index buffer with the addresses of the designated areas of said memory containing said text sections and for ascertaining as a result of such comparison an address identifying the memory area containing the next sequential text section.

4. A word processing system according to claim 3 wherein said display circuitry includes:
    a memory address buffer containing the memory address from which text is accessed from said memory for display on said screen, said text being stored in said memory in sequential address locations, the contents of said memory address buffer being incremented as text is read from memory during generation of said display, and
    buffer loading means for loading said memory address buffer, at the beginning of generation of a video display, with said ascertained address identifying the memory area containing the next sequential text section, whereby said next sequential text section will be displayed on said screen.

5. A word processing system according to claim 2 wherein said page of text is divided into three sections each containing approximately one-third of said page of text, and wherein if said currently displayed portion of text is part of the last one-third of said page, said display advance control means will ascertain that the first one-third section is the next sequential section.

6. A display advance system for use with a word processing apparatus having a memory for storing a full page of text, consecutive lines of said text being stored in consecutive rows of said memory, and a video screen capable of displaying only a portion of that full page of stored text, said system comprising:
    a memory address buffer and circuitry for accessing from said memory consecutive lines of text beginning from an address specified by the contents of said memory address buffer, the video screen displaying said accessed lines of text,
    interrupt means for loading said memory address buffer at the beginning of each frame of the video display with the address of the memory row containing the top line of text to be displayed, and
    display advance means, actuated in response to a control signal, for ascertaining from the presently displayed text the different top line of text memory address of a different section of text, said interrupt means loading said different top line of text memory address into said memory address buffer, thereby causing an advance of the display to said different section.

7. A display advance system according to claim 6 wherein said video screen displays a cursor, and wherein said display advance means comprises:
    a cursor index buffer for storing the memory address corresponding to the row of text in which said cursor is located, and
    comparison means for deriving said different top line of text memory address from the address stored in said cursor index buffer.

8. A display advance system according to claim 7 wherein said full page of stored text is divided into a small number of sections overlapping each other by one line, and wherein said comparison means first compares the address stored in said cursor index buffer with the memory addresses defining the areas in memory that store said sections, said comparison means utilizing the result of said comparison to ascertain as the different top line of text address the memory address for the first row of the next successive section of text.

9. A display advance system according to claim 7 wherein said comparison means comprises a microprocessor programmed to perform said comparison, and wherein said control signal is produced by depression of a DISPLAY ADVANCE control key.

10. In a word processor having a video screen capable of simultaneously displaying only one of a sequence of fixed approximately one-third sections of a full page of text stored in a memory, a display advance system for causing the screen to directly display the next one-third text section upon actuation of a control key, comprising:
    (a) means for ascertaining from the location of a displayed cursor the identity of the next sequential text section and the initial address of the memory area storing that next fixed one-third section, and (b) means for directly generating the video display using text from that memory area.

11. A display advance system according to claim 10 wherein said means for ascertaining comprises:
   a microprocessor,
   a buffer, and
   program means for controlling said microprocessor to relocate the cursor to the bottom row of the text section next following that section in which the cursor currently is located, and for entering into said buffer said initial address of the memory area storing said next section, said means for generating utilizing the resultant contents of said buffer for generating said video display.

12. A display advance system according to claim 10 wherein said means for generating, upon a single activation of said control key, generates, beginning on the next video frame, the video display using text from that memory area.

* * * * *